(12) United States Patent
Laumeier

(10) Patent No.: US 8,701,376 B2
(45) Date of Patent: Apr. 22, 2014

(54) CONDITIONING DEVICE WITH ROLLERS SEALABLE WITHIN HOUSING SECTIONS

(75) Inventor: Ludger Laumeier, Rietberg (DE)

(73) Assignee: CLAAS Selbstfahrenda Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 13/459,605

(22) Filed: Apr. 30, 2012

(65) Prior Publication Data

US 2013/0086879 A1  Apr. 11, 2013

(30) Foreign Application Priority Data

Oct. 6, 2011 (DE) .......................... 10 2011 106 141

(51) Int. Cl.
*A01D 61/00* (2006.01)

(52) U.S. Cl.
USPC ....................................... 56/16.4 A

(58) Field of Classification Search
USPC ............ 56/16.4 R, 16.4 B, 16.4 A, 16.5, 14.1
See application file for complete search history.

(56) References Cited

U.S. PATENT DOCUMENTS

| | | | |
|---|---|---|---|
| 3,977,165 A * | 8/1976 | Klinner et al. ............. | 56/16.4 R |
| 4,696,432 A * | 9/1987 | Russ et al. ............. | 241/101.742 |
| 4,767,067 A * | 8/1988 | Bruer et al. ..................... | 241/81 |
| 5,863,005 A * | 1/1999 | Bramstedt et al. ..... | 241/101.742 |
| 6,425,232 B1 * | 7/2002 | Desnijder et al. .......... | 56/16.4 B |
| 6,539,693 B2 * | 4/2003 | Krone et al. .................... | 56/16.6 |
| 6,604,352 B1 * | 8/2003 | Tyvaert et al. ............ | 56/16.4 B |
| 6,988,352 B2 * | 1/2006 | Van Vooren ................ | 56/16.4 R |
| 7,681,384 B2 | 3/2010 | Scherer | |
| 7,874,133 B2 * | 1/2011 | Depestel ........................ | 56/13.3 |
| 8,276,355 B2 * | 10/2012 | Schafer et al. ............. | 56/16.4 R |
| 2007/0191179 A1 * | 8/2007 | Hugenroth et al. ............... | 477/2 |

FOREIGN PATENT DOCUMENTS

| | | | | |
|---|---|---|---|---|
| DE | 3522376 A1 * | 1/1987 | ............. | A01F 29/12 |
| DE | 4215696 A1 * | 11/1993 | ............. | A01D 43/08 |

* cited by examiner

*Primary Examiner* — Arpád Fábián-Kovács
(74) *Attorney, Agent, or Firm* — Michael J. Striker

(57) ABSTRACT

A conditioning device for an agricultural harvesting machine includes a first and a second roller that each are supported with respect to a housing to enable the rollers to rotate about respective longitudinal axes in order to delimit a gap through which crop passes. The housing is formed with a first and a second housing section such that the second housing section moves relative to the first housing section from a closed position in which the housing seals the rollers with respect to the surroundings into a closed position in which the rollers are accessible from outside the housing. The rollers are each supported with respect to the first housing section by way of a shaft extending between the first and the second housing sections.

17 Claims, 5 Drawing Sheets

CONDITIONING DEVICE WITH ROLLERS SEALABLE WITHIN HOUSING SECTIONS

CROSS-REFERENCE TO A RELATED APPLICATION

Figure 1:
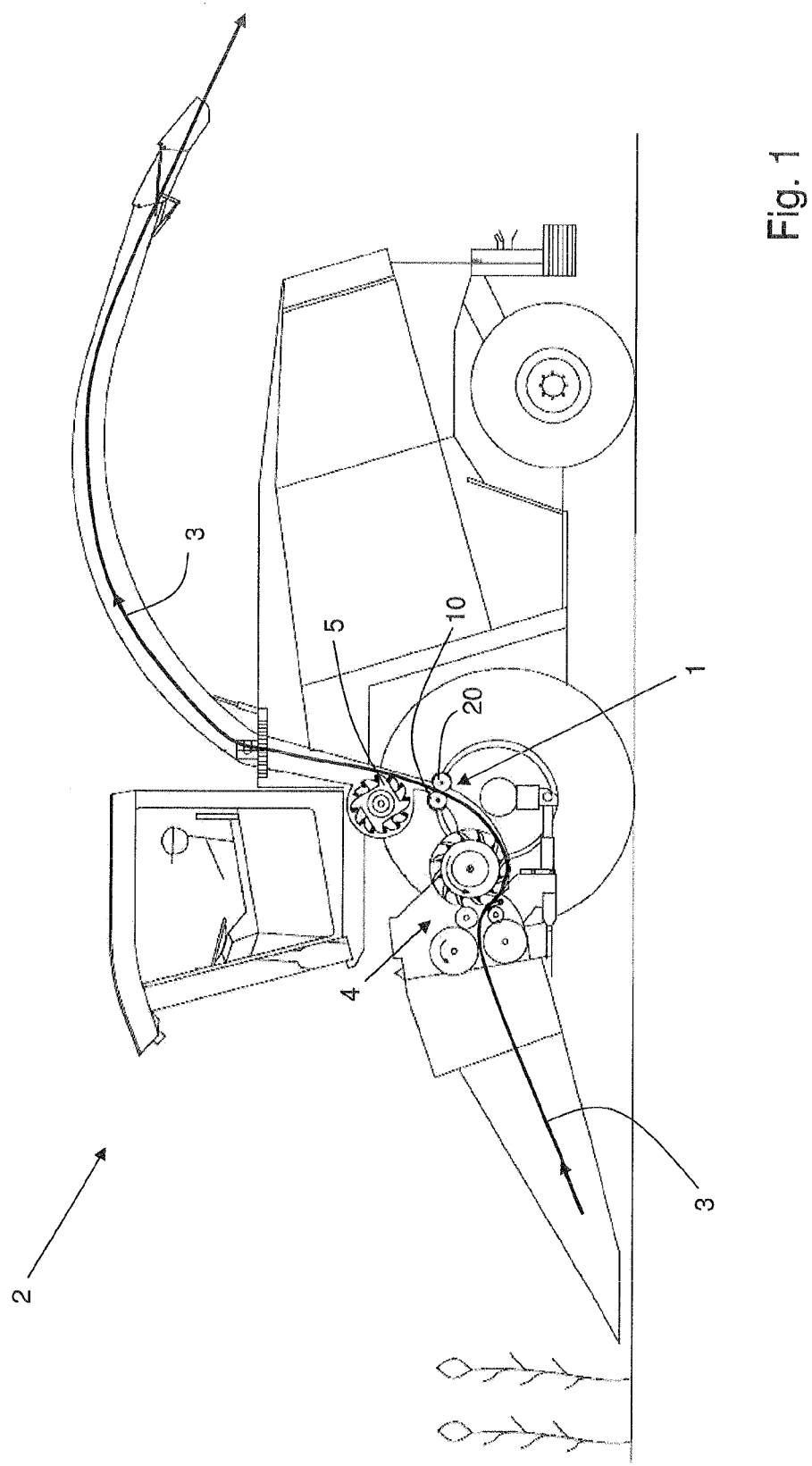

The invention described and claimed hereinbelow is also described in German Patent Application DE 10 2011 106141.3, filed on Oct. 6, 2011. The German Patent Application, whose subject matter is incorporated by reference herein, provides the basis for a claim of priority of invention under 35 U.S.C. 119(a)-(d).

BACKGROUND OF THE INVENTION

The invention relates to a conditioning device for a self-propelled agricultural harvesting machine, configured with functional elements including rollers and which operates with high output while preventing crop from escaping and which provides reliable and user-friendly access to the functional elements for purposes of maintenance and repair.

Conditioning devices are used in agricultural harvesting technology, particularly on self-propelled forage harvesters, to open up grains contained in the crop that was picked up, to improve digestibility when subsequently fed to animals. In the case of self-propelled forage harvesters, such conditioning devices are installed downstream of a chopping assembly relative to the direction of crop flow. Crop that has already been chopped enters the conditioning device where it is processed and then, with support from a downstream discharge accelerator, is discharged by way of a transfer device into a loading container.

To perform the above-mentioned function of opening up grains contained in the crop, current conditioning devices comprise two rollers that have a profile that is suitable for processing crop. Each of the rollers is supported with respect to a housing of the conditioning device in such a way that the rollers can rotate about their longitudinal axes and are driven by a belt drive provided at the harvesting machine. Due to their placement in parallel and with defined separation, the rollers delimit a gap through which the crop to be processed passes in the direction of crop flow and is thereby processed between the profiled rollers. Advantageously, the rollers rotate in opposite directions but at slightly different rates of rotation in order to increase the frictional effect.

Due to an increasing demand for harvesting machine output, the conditioning devices thereof must also be capable of processing a continually increasing throughput of crop. This requires components, in particular such as rollers, bearings, housing, drive, etc., which have increasingly greater dimensions. At the same time, it should be ensured that operation and control are reliable and maintenance-friendly. For purposes of maintenance and repair, it is always necessary to maintain easy access to the rollers, which are subject to considerable wear, and the shafts and bearings thereof. However, the functional components must remain closed to the outside during the harvesting operation to ensure that crop particles or juices that emerge from the crop during processing are retained inside.

In a conditioning device known from the prior art, according to U.S. Pat. No. 7,681,384 B2, access to the rollers for purposes of maintenance and repair is created by designing the housing of the conditioning device as two pieces. In the housing, a first roller is supported at a first frame part and a second roller is supported at a second frame part, and the two frame parts can be swivelled opposite one another from a closed position into an opened position, and ensures easy access to each of the two rollers in the opened position. In particular, the rollers can be removed from the housing in the radial direction in the closed housing position.

The disadvantage of the design is that it is very difficult for an operator to swivel the particular frame part that is at the top when installed in a harvesting machine, due to the heavy weight of rollers that are used today. A great deal of force and dexterity is therefore required to disassemble the rollers in the narrow maintenance space of a forage harvester. As such, the risk of injury is not inconsiderable since it is possible that the upper frame part will drop downward in an uncontrolled manner.

SUMMARY OF THE INVENTION

The present invention provides a conditioning device and agricultural harvesting machine that overcome shortcomings of the known arts.

In one embodiment, the inventive conditioning device is designed to be operated with high output while preventing crop from escaping, wherein reliable and user-friendly access to functional elements of the conditioning device, in particular to the rollers, for purposes of maintenance and repair is ensured.

The conditioning device comprises a two-pieced housing having two housing sections, it being possible to move a second housing section with respect to a first, stationary, housing section from a closed position into an opened position (and back). Such a configuration ensures that, in the closed position, the housing covers the rollers with respect to the surroundings, thereby ensuring that crop passing through the gap or juices emerging from the crop do not escape from the housing and into the surroundings during the harvesting operation and result in contamination there or simply result in crop losses. The two housing sections therefore perform a sealing function in addition to a support function.

Each of the rollers is furthermore supported at the first, stationary housing section by way of a shaft extending between the housing sections. Such a configuration, primarily the extension of the shafts between the housing sections, ensures that the rollers are easily accessed when the housing is open since the housing sections, which are open with respect to one another, necessarily expose the rollers and the shafts and bearing points thereof. Convenient disassembly or assembly in the radial direction with respect to the roller longitudinal axis is therefore made possible. The support of both shafts at the first, stationary housing section, which is also provided, requires that a roller not be supported at the second housing section. The function of the second housing section is therefore reduced mainly to that of a cover, which seals the housing during harvesting operation and contributes to the reinforcement of the housing. This results in the advantageous effect that the second housing section is markedly relieved in terms of weight and can therefore be opened in a manner that is considerably easier and more reliable.

The second housing section is basically movable in a different manner with respect to the first housing section. Advantageously, the housing sections are connected to one another in such a way that they can pivot about an axis extending parallel to the shafts.

Preferably, each of the shafts extends from both sides of the housing to permit the support thereof on bearings disposed outside the housing. Due to such a configuration, the bearing points of the shafts can be well protected against the strong contamination formed inside the housing by processed crop.

To enable the conditioning device to perform processing at different intensities, at least one of the rollers is advantageously supported such that the distance between the rollers can be changed. Changing the distance between the rollers makes it possible to influence the gap dimension, which corresponds thereto, of the gap through which the crop passes. The distance can be changed in a structurally advantageous manner by using pivot bearings to support the second roller, said pivot bearings being displaceably supported at the first housing section by way of a linear guide. Due to the use of a linear guide, the second roller can be guided into a desired distance position reliably and precisely even against strong forces.

Different types of actuators can be used to apply the actuating force. Advantageously, a hydraulic cylinder that displaces the shaft of the second roller against a preload of a spring element is used to change the distance between the rollers. Such an actuator-spring design ensures that the shaft can be displaced precisely and without backlash.

To permit shaft support outside the housing, recesses are advantageously formed at the first and/or the second housing section, which are aligned with the shafts and are shaped to permit passage thereof through the housing. To enable passage of a shaft, recesses having mirror symmetry with respect to the housing separating line can be formed in regions of the first and second housing sections that impact one another and form a round hole or an elongated hole in the housing wall, for example, when the housing is closed. Advantageously, recesses of the first and/or second housing section allocated to the second shaft form an elongated hole to ensure that the shaft can be displaced when the housing is closed.

To prevent crop from escaping in the closed state of the housing, which is to say during the conditioning operation, the housing advantageously forms a circumferential housing separating edge, which is equipped with a seal.

Advantageously, a sealing disk having a passage formed therein is used to seal the housing in the region of the passage of a shaft through the housing, wherein the particular shaft extends through the passage of the sealing disk in a section between the roller and a bearing located outside the housing. The separated housing can also be reliably sealed in the region of the shaft passage by way of such a sealing disk.

Advantageously, the sealing disk is disposed in a non-rotatable manner with respect to the housing, and can be sealed with respect to the shaft by way of a shaft seal, such as a radial shaft seal, for example.

In addition, the sealing disk comprises a circumferential seal in at least one region separated from the passage thereof, which seals the sealing disk with respect to the housing, in particular with respect to the adjoining housing sections, when the housing is closed.

Furthermore, a groove that is suitable for accommodating an edge region of the housing is formed on the circumference of the sealing disk. When an edge region of the housing is accommodated in the groove, the result, depending on the depth of the groove, is bilateral coverage by the sealing disk, thereby creating a particularly effective, labyrinth-type seal. A high sealing effect is achieved by way of additional sealing rings between the housing and the sealing disk, which can be disposed inside and/or outside the housing due to the sealing disk that reaches around the housing edge in the manner of a labyrinth.

The use of a sealing disk of the type described above, that is allocated to the second shaft, proves particularly advantageous when it is displaceable with respect to the housing parallel to the linear guide of the second shaft. Such an embodiment ensures that the housing is reliably sealed even when a second roller is provided, the separation of which can be changed.

Advantageously, the circumferential seal of the sealing disk of the second shaft should cover an elongated hole formed by the first and/or the second housing section in all roller-separation positions.

To ensure that operation of the conditioning device is as reliable and simple as possible, the second housing section is disposed above the first housing section when the housing is closed. In this case, the second housing section forms a cover that lies on the first housing section, thereby enabling gravity-induced sealing forces to be applied onto the housing separating line.

The invention further relates to a self-propelled agricultural harvesting machine, in particular a self-propelled forage harvester, which is equipped with an above-described conditioning device. The conditioning device is disposed in the crop bale chamber of the harvesting machine.

BRIEF DESCRIPTION OF THE DRAWING FIGURES

Figure 2:
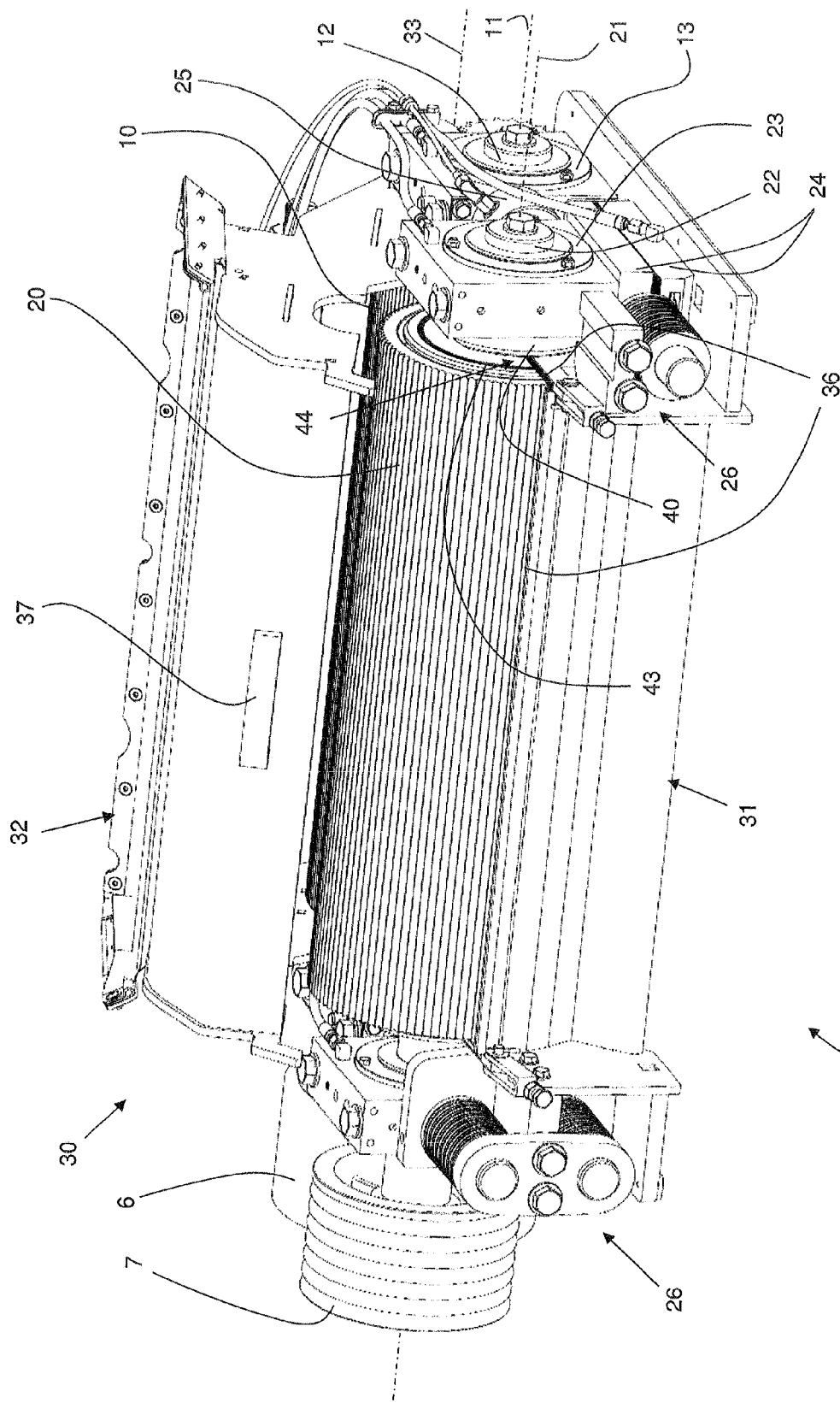
Figure 3:
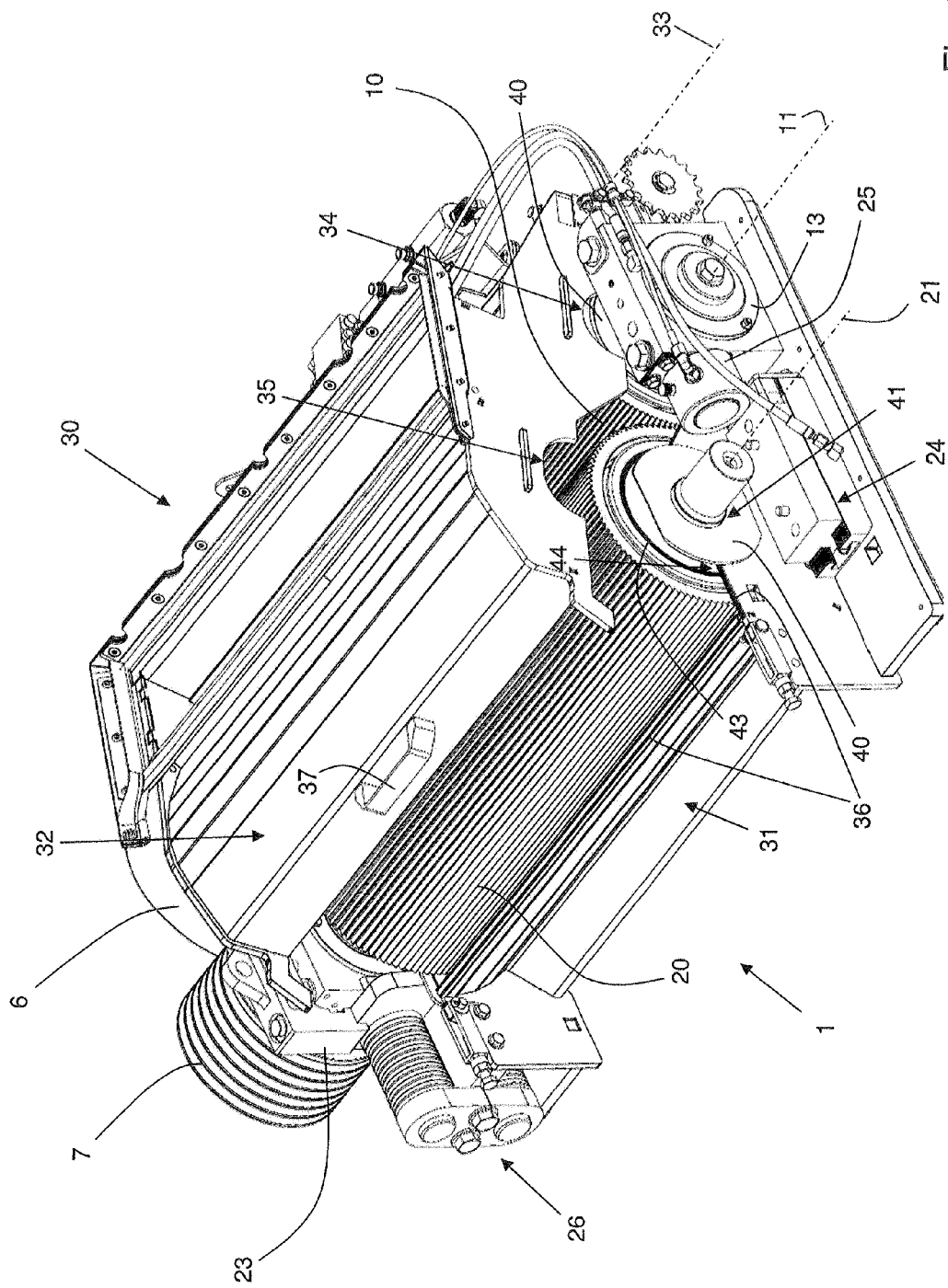
Figure 4:
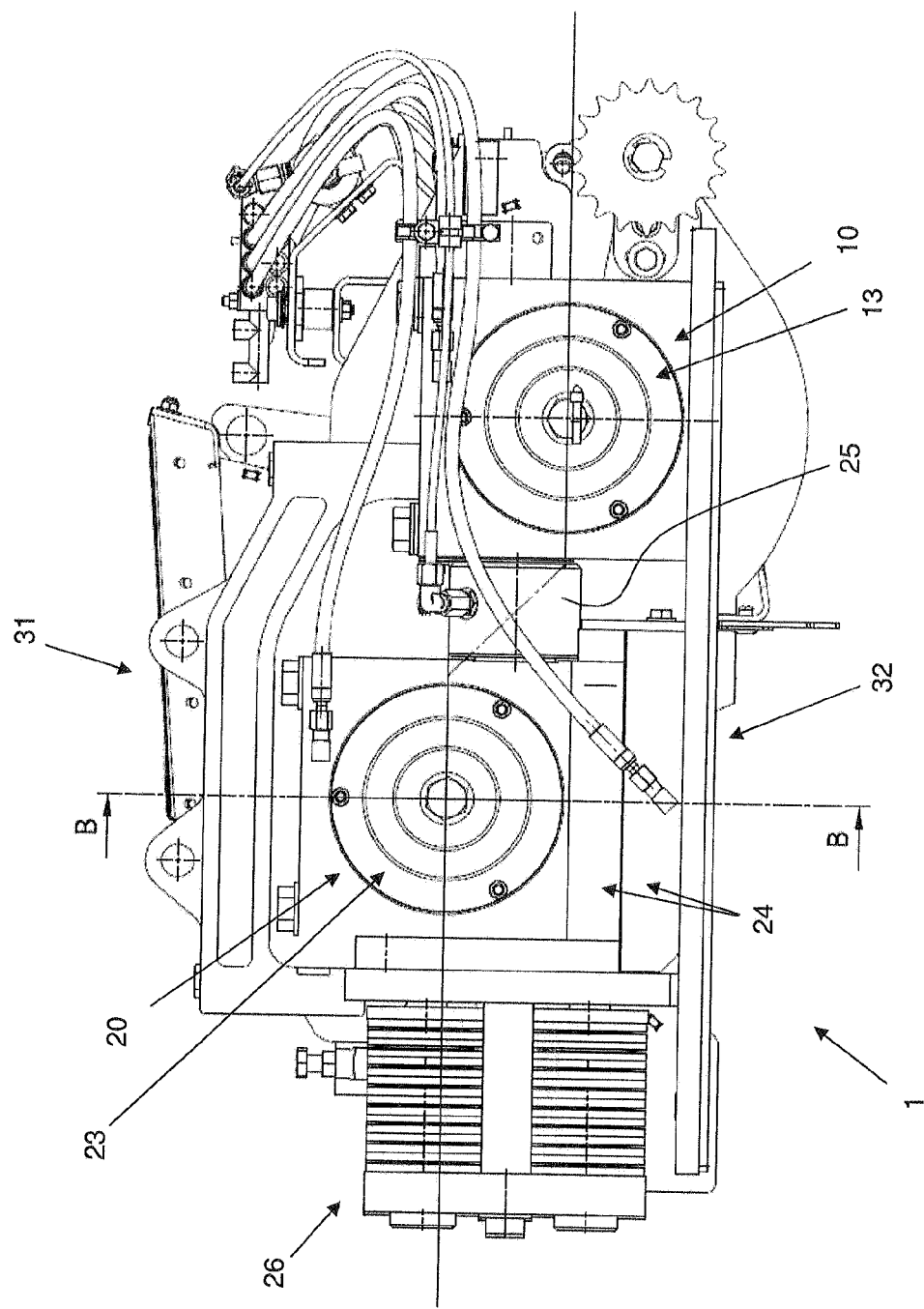
Figure 5:
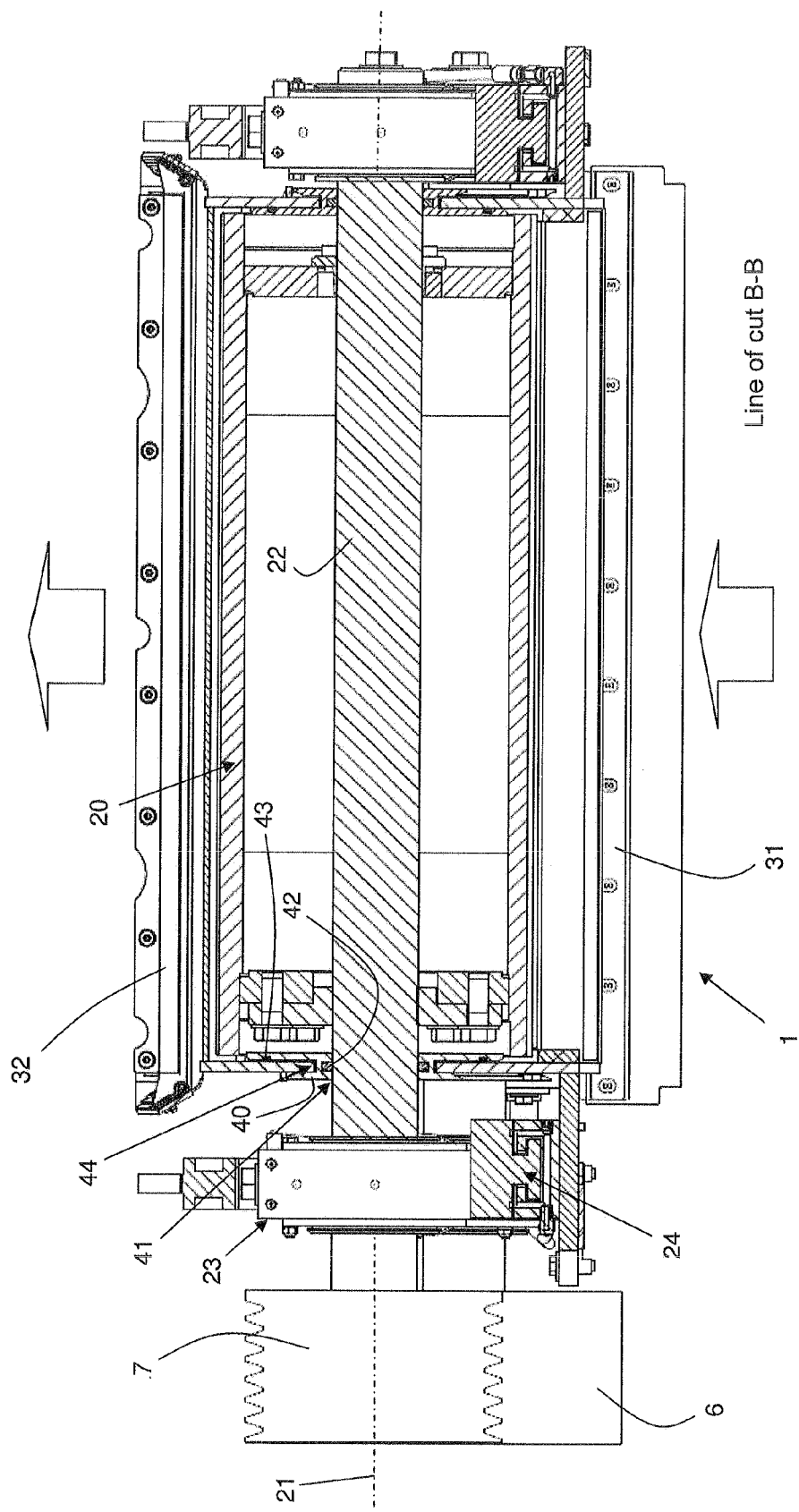

Further features and advantages of the invention will become apparent from the description of embodiments that follows, with reference to the attached figures. Shown are:

FIG. 1 a schematic side view of a self-propelled forage harvester;

FIG. 2 a perspective view of a conditioning device according to the invention, according to the single exemplary embodiment of the invention, in the opened housing position;

FIG. 3 a perspective view of the conditioning device from FIG. 1, wherein the front, with respect to the view, bearing of the second shaft is not shown, to more clearly show a sealing disk;

FIG. 4 a side view of the conditioning device according to the invention, in the closed housing position; and FIG. 5 a side view of the conditioning device according to the invention, according to the line of cut B-B from FIG. 4.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

FIG. 1 shows, in a schematic side view, a self-propelled forage harvester 2 while harvesting on the field. The forage harvester 2 harvests plants from the field in order to convey the crop 3 contained therein in the form of a crop stream (indicated in FIG. 1 as lines with arrows) through the processing and conveyor devices of the forage harvester 2 and discharge it by way of a transfer device into a loading container, which is not shown. The processing and conveyor devices of the forage harvester 2 comprise, inter alia, a chopping assembly 4, which, in cooperation with a shear bar, fragmentizes the crop by way of a rotating chopper drum equipped with blades, a conditioning device 1, which is disposed in a conveyor chute, downstream of the chopping assembly 4 in the direction of crop flow and a discharge accelerator 5 disposed downstream of the conditioning device 1 in the conveyor chute in the direction of crop flow.

The discharge accelerator 5 accelerates the crop 3 by way of rotating paddles to ensure reliable discharge through the transfer device. The conditioning device 1 disposed between the chopping assembly 4 and the discharge accelerator 5 in the crop bale chamber is preferably a conditioning device 1 according to the invention, which will be described in the following with reference to the remaining figures.

FIG. 2 shows an inventive conditioning device 1 in a perspective view. The conditioning device 1 mainly comprises a pair of rollers, namely a first roller 10 and a second roller 20, each of which is supported with respect to a housing 30 in such a way that they can rotate about their longitudinal axes 11 and 21, respectively. Two belt pulleys 6, 7 are used to drive the rollers 10, 20. The belt pulley 6 has a drive connection with the first roller 10 by way of a shaft 12, and the belt pulley 7 has a drive connection with the second roller 20 by way of a shaft 22.

The rollers 10, 20 are disposed parallel to one another and separated from one another in such a way that they delimit a gap through which crop passes during operation of the conditioning device 1. To convey the crop in one direction of crop flow, the rollers 10, 20 are driven in opposite directions, wherein, due to the profiled surfaces of the rollers 10, 20 and, a slight rotational speed difference of the shafts 12, 22, the crop is processed (for example, pulverized, squeezed, shredded, etc.) between the rollers in order to open up grains contained therein.

The housing 30 is divided into two pieces and comprises a first housing section 31, to which a second housing section 32 is connected in such a way as to be pivotable about an axis 33, which extends parallel to the shafts 12, 22. The second (upper) housing section 32 therefore forms a cover for the housing section 31, which serves as a support frame for functional elements of the conditioning device 1. In FIGS. 2 and 3, the second housing section 32 is in a raised position relative to the first housing section 31 and the housing 30 is open, wherein the rollers 10, 20 and other functional elements are accessible from outside the housing 20 for purposes of maintenance and repair, for example.

By lowering the second housing section 32, the housing 30 can be moved into a closed position (cf. FIG. 4) in which the housing 30 seals the rollers 10, 20 with respect to the surroundings. The closed housing position 30 is selected in order to operate the conditioning device 1 as intended during harvesting, to prevent juices or other crop components, which are produced during crop processing, from escaping the working region of the rollers 10, 20 to the outside of the housing 30 and contaminating further functional elements there or the maintenance space of a forage harvester 2, for example. A handle 37 is installed on the second housing section 32 for manually opening and closing the housing 30, which, when the conditioning device 1 is installed in a forage harvester 2 according to FIG. 1, is easily accessed from a maintenance space located behind the conditioning device 1.

As shown in FIGS. 2 and 3, the rollers 10 and 20 are mounted on a first shaft 12 and a second shaft 22, respectively. Each of the shafts 12 and 22 extends from housing 30 on both sides and are supported in first pivot bearings 13 and second pivot bearings 23, respectively, which are structurally identical and are disposed outside the housing 30. The pivot bearings 13 allocated to the first shaft 12 are fastened directly to a first housing section 31.

In contrast thereto, the pivot bearings 23 allocated to the second shaft 22 are supported with respect to the first housing section 31 by way of a linear guide 24. As shown more clearly in FIG. 3 (in which one bearing 23 was omitted for clarity), the linear guide 24 is designed as a T-guide and thereby permits displacement of the second shaft 22 transversely with respect to the longitudinal axis 21 thereof. This arrangement makes it possible to change the distance between the rollers 10 and 20 and, therefore, the gap width that is relevant to crop processing.

FIG. 4 shows, in a side view of the conditioning device 1, that a hydraulic cylinder 25 disposed between the stationary bearing 13 and the displaceable bearing 23 is used to change the distance between the rollers 10, 20. To adjust the position of the bearing 23 precisely and without backlash, the hydraulic cylinder acts against the preload of a spring element 26, which is designed as a disk spring arrangement. FIG. 3 shows that recesses 34, 35 are formed in the first and second housing sections 31, 32, respectively, for passage of the first shaft 12 and the second shaft 22.

For the first shaft 12, the recesses 34 in the first and the second housing section 31, 32 are each approximately semicircular and result in a round passage for the shaft 12 when the housing 30 is closed. For the second shaft 22, the recesses 35 in the first and the second housing section 31, 32 are each designed such that an elongated hole is produced, as a passage for the shaft 22, when the housing 30 is closed. It is thereby ensured that the shaft 22 can be displaced parallel to the linear guide 24 in order to change the distance between the rollers.

The conditioning device 1 has various further features for ensuring that the housing 30 has seal integrity when closed, in particular during operation of the conditioning device 1.

FIG. 3 shows that the first and the second housing sections 31, 32 form a common housing separating edge by way of a circumferential region except in the region of the shaft passages through the housing 30. This circumferential housing separating edge, which is interrupted only by the shaft passages, is equipped with a gasket 36.

A sealing disk 40 is used to seal the housing 30 in the region of the shaft passages in particular, as shown in the views in FIGS. 2, 3 and 5. As shown best in FIG. 5, the sealing disk 40 has a passage 41 through which the particular shaft 22 (or, analogously, shaft 12) passes in a section between the roller 20 (or 10) and the bearing 23 (or 13) disposed outside the housing 30. The sealing disk 40 is non-rotatably disposed with respect to the housing 30 and is sealed with respect to the shaft (here: second shaft 22) by way of a shaft seal 42. In a basically identical manner, a sealing disk provided for the first shaft 12 seals with respect to the shaft 12.

As shown best in FIGS. 3 and 5, the sealing disk 40 comprises, in addition to the shaft seal 42, a circumferential seal 43 in at least one region separated radially from the passage 41 (for the shaft) thereof. it can be designed as a seal and, when the housing 30 is closed, seals the sealing disk 40 with respect to the housing 30, in particular the first housing section 31 and the second housing section 32.

FIG. 5 shows that a groove 44, which is suitable for accommodating the edge regions of the housing sections 31 and 32, is formed in a circumferential region of the sealing disk 40. Accordingly, the housing 30 is covered toward the inside and toward the outside by the sealing disk 40. In addition to the seal 43, which is circumferential on the inside in this case, it would also be possible to provide a seal, which is not shown, that is circumferential on the outside of the housing due to the labyrinth-type configuration of the sealing disk 40 relative to the housing 30, in order to further increase the sealing effect.

FIG. 3 shows that the sealing disk 40 allocated to the second shaft 22 comprises two opposing flat sections in the region thereof located outside the housing 30. These flat sections, which have gliding contact with an elongated projection on the second housing section 32 when housing 30 is closed, ensure that the sealing disk 40 is non-rotatable with respect to the housing 30 but is displaceable with the second shaft 22 with respect to the housing 30.

FIG. 3 further shows that the circumferential seal 43 of the sealing disk 40 should advantageously cover the elongated hole, which is formed by the first and the second housing sections 31, 32, in all roller-separation positions in order to seal the housing 30 in all separation positions.

The wide arrows above and below the conditioning device 1 that are shown in FIG. 5 indicate the direction of flow of the crop through the conditioning device 1. The conditioning device 1 described in this manner is preferably installed in a self-propelled agricultural harvesting machine in the form of a forage harvester.

The following list of reference signs of various elements mentioned above is included (as follows), for ease of explanation:

1 conditioning device
2 forage harvester
3 crop
4 chopping assembly
5 discharge accelerator
6 belt pulley
7 belt pulley
10 first roller
11 longitudinal axis (first roller)
12 first shaft
13 first bearing
20 second roller
21 longitudinal axis (second roller)
22 second shaft
23 second bearing
24 linear guide
25 hydraulic cylinder
26 disk spring arrangement
30 housing
31 first housing section
32 second housing section
33 pivot axis
34 recess
35 recess
36 seal
37 handle
40 sealing disk
41 passage
42 shaft seal
43 seal As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A conditioning device (1) for an agricultural harvesting machine (2), comprising:
    a housing (30);
    a first roller (10) with a rotational axis (11); and
    a second roller (20) with a rotational axis (21);
    wherein the first roller (10) and the second roller (20) are each supported at the housing (30) to enable rotation about the first and second roller respective longitudinal axes (11, 21) in order to delimit a gap through which a crop (3) passes;
    wherein the housing (30) comprises a first stationary housing section (31) and a second housing section (32) that are configured to enable the second housing section (32) to move relative to the first housing section (31) from a closed position in which the housing (30) seals the first roller (10) and the second roller (20) with respect to surroundings, into an open position in which the first roller (10) and the second roller (20) are accessible from outside the housing (30) and where the first roller and the second roller remain in the first housing section (31); and
    wherein the first roller (10) and the second roller (20) are supported at the first housing section (31) by way of respective shafts (12, 22) that extend between the first housing section (31) and the second housing section (32).

2. The conditioning device according to claim 1, wherein the first housing section (31) and the second housing section (32) are connected to one another in such a way as to be pivotable about an axis (33) extending parallel to the shafts (12, 22).

3. The conditioning device according to claim 1, wherein each of the shafts (12, 22) is supported by bearings (13, 23) disposed outside the housing (30).

4. The conditioning device according to claim 1, wherein one of the first roller (10) and the second roller (20) is supported in such a way that the distance between the first roller (10) and the second roller (20) is changeable.

5. The conditioning device according to claim 3, wherein the bearings (23) are displaceably supported at the first housing section (31) by way of a linear guide (24) are used to support the second roller (20).

6. The conditioning device according to claim 5, wherein a hydraulic cylinder (25) displaces the shaft (22) of the second roller (20) against a preload of a spring element (26) is used to change the distance between the first roller (10) and the second roller (20).

7. The conditioning device according to claim 1, where recesses (34, 35) are formed at the first housing section (31), the second housing section (32), or both, which recesses are aligned with the shafts (12, 22) and are shaped to permit passage of the shafts thereof through the housing (30).

8. The conditioning device according to claim 7, wherein the recesses (35), which are allocated to the second shaft (20), form an elongated hole to ensure that the shaft (20) can be displaced when the housing (30) is closed.

9. The conditioning device according to claim 1, wherein when the housing (30) is closed, a circumferential housing separating edge equipped with a gasket (36) forms between the first housing section (31) and the second housing section (32).

10. The conditioning device according to claim 1, wherein a sealing disk (40) having a passage (41) formed therein seals the housing (30) in the region of the passage of one of the shafts (12, 22) through the housing (30), and wherein the one shaft (12, 22) extends through the passage (41) of the sealing disk (40) in a section between the first roller (10) and the second roller (20) and a bearing (13, 23) located outside the housing (30).

11. The conditioning device according to claim 10, wherein the sealing disk (40) is non-rotatably disposed with respect to the housing (30) and is sealed with respect to the one shaft (12, 22) by way of a shaft seal (42).

12. The conditioning device according to claim 10, wherein the sealing disk (40) comprises a circumferential seal (43) in at least one region separated from the passage thereof (41), which seals the sealing disk (40) with respect to the housing (30) when the housing (30) is closed.

13. The conditioning device according to claim 10, wherein a groove (44) that configured for accommodating an edge region of the housing (30) is formed on the circumference of the sealing disk (40).

14. The conditioning device according to claim 10, wherein a sealing disk (40) allocated to the second shaft (22) is displaceable with respect to the housing (30) parallel to a linear guide (24) of the second shaft (22).

15. The conditioning device according to claim 14, wherein the circumferential seal (43) of the sealing disk (40) of the second shaft (22) covers the elongated hole formed by the first housing section (31) or the second housing section (32) or both in all roller-separation positions.

16. The conditioning device according to claim 1, wherein the second housing section (32) is disposed above the first housing section (31) when the housing (30) is closed.

17. A self-propelled agricultural harvesting machine comprising a conditioning device (1) disposed in a crop bale chamber of the harvesting machine, the conditioning device (1) comprising:
a housing (30);
a first roller (10) with a rotational axis (11); and
a second roller (20) with a rotational axis (21);
wherein the first roller (10) and the second roller (20) are each supported at the housing (30) to enable rotation about each of the first and second roller respective longitudinal axes (11, 21) in order to delimit a gap through which a crop (3) passes;
wherein the housing (30) comprises a first stationary housing section (31) and a second housing section (32) that are configured to enable the second housing section (32) to move relative to the first housing section (31) from a closed position in which the housing (30) seals the first roller (10) and the second roller (20) with respect to surroundings, into an open position in which the first roller (10) and the second roller (20) both remain in the first housing section and are accessible from outside the housing (30); and
wherein the first roller (10) and the second roller (20) are supported at the first housing section (31) by way of respective shafts (12, 22) that extend between the first housing section (31) and the a-second housing section (32).

* * * * *

UNITED STATES PATENT AND TRADEMARK OFFICE
CERTIFICATE OF CORRECTION

PATENT NO.      : 8,701,376 B2                                Page 1 of 1
APPLICATION NO. : 13/459605
DATED           : April 22, 2014
INVENTOR(S)     : Ludger Laumeier It is certified that error appears in the above-identified patent and that said Letters Patent is hereby corrected as shown below:

Title Page, Item (73) Assignee

"CLAAS Selbstfahrenda." should read -- CLAAS Selbstfahrende. --

Signed and Sealed this
Twenty-second Day of July, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,701,376 B2 | Page 1 of 1 |
| APPLICATION NO. | : 13/459605 | |
| DATED | : April 22, 2014 | |
| INVENTOR(S) | : Laumeier et al. | |

It is certified that error appears in the above-identified patent and that said Letters Patent is hereby corrected as shown below:

Title Page, Item (12) delete "Laumeier" and insert --Laumeier et al.--.

Title Page, Item (75) Inventors should read:

--Ludger Laumeier, Rietberg (DE); Arne Luebben, Alsfletch (DE)--.

Signed and Sealed this
Twenty-ninth Day of September, 2015

Michelle K. Lee
*Director of the United States Patent and Trademark Office*